United States Patent [19]

Brewer et al.

[11] 3,735,686

[45] May 29, 1973

[54] CAMERA SYSTEMS

[75] Inventors: Thomas Howard Brewer; Roger William Blundell, both of Chelmsford, England

[73] Assignee: Sidney R. Littlejohn & Co., Ltd., London, England

[22] Filed: Nov. 22, 1971

[21] Appl. No.: 200,751

[30] Foreign Application Priority Data

Dec. 18, 1970 Great Britain.....................60,283/70

[52] U.S. Cl....................................95/44 R, 355/56
[51] Int. Cl.................................................G03b 3/00
[58] Field of Search..............355/55–60; 95/44 R, 64

[56] References Cited

UNITED STATES PATENTS

| | | | |
|---|---|---|---|
| 3,641,892 | 2/1972 | Strehle | 95/64 R |
| 3,366,004 | 1/1968 | Czernek et al. | 355/58 |
| 3,052,156 | 9/1962 | Blatherwick | 355/62 |

FOREIGN PATENTS OR APPLICATIONS 902,909   8/1962   Great Britain.........................355/56

*Primary Examiner*—Samuel S. Matthews
*Assistant Examiner*—Richard A. Wintercorn
*Attorney*—Irvin S. Thompson and Robert J. Patch

[57] ABSTRACT

A constant focus drive apparatus for controlling the positioning of an object and a lens arrangement in a camera system relative to a desired plane so as to keep an image of the object focused in such plane, comprising means e.g. potentiometers for measuring the object and image distances and for producing distance signals representative thereof, drive means e.g. one or more servo systems and/or a manually controlled motor connected to the camera system for varying both the object and image distances, and a computer which may be analogue or digital and may use electricity, pneumatic or hydraulic power, or other powering medium and which is programmed with the lens formula of the camera system to compute, in accordance with the measured values of the object and image distances, a control signal for application to the drive means to alter one or both of said distances as necessary so that the image is kept focused in said plane.

8 Claims, 5 Drawing Figures

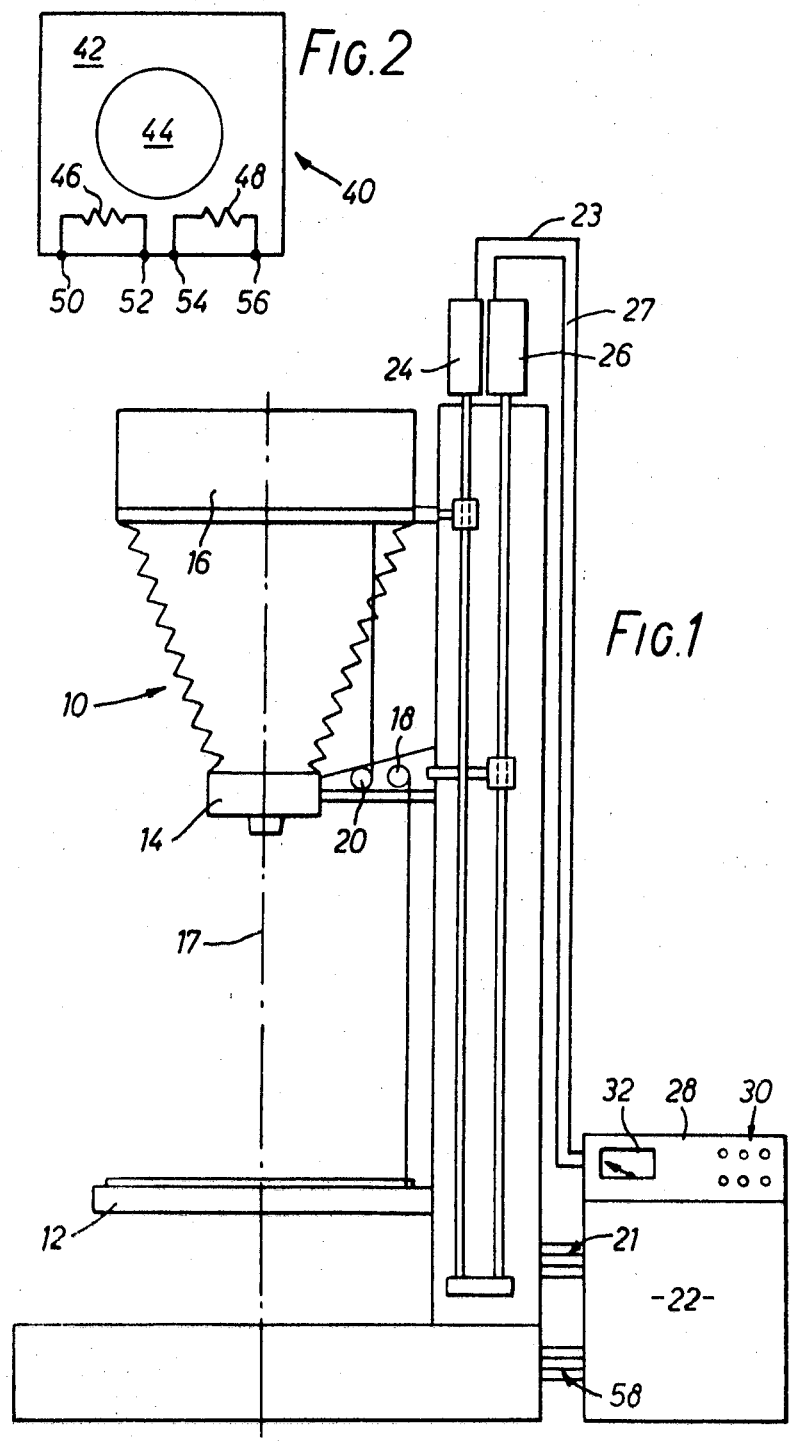

CAMERA SYSTEMS

This invention relates to apparatus for controlling the positioning of an object and a lens arrangement in a camera system relative to a desired plane to produce an image of the object in such plane.

In the following, the mathematical relationship defining the relative positioning of the object, the lens arrangement and the image produced, and that defining the magnification, will be referred to as the "lens formula" and the "magnification formula" respectively. In the embodiments of the invention described herein, the lens arrangement comprises a single convergent lens, and these formulae are, respectively:

$$1/u + 1/v = 1/f$$

and $$M = v/u$$

where
- $u$ = the distance from the object to the lens nodal position (the object distance);
- $v$ = the distance from the image to the lens nodal position (the image distance);
- $f$ = the focal length of the lens; and
- $M$ = the magnification of the object produced.

It will be evident that with a more complex lens arrangement, such as an assembly of different lenses, these formulae may be different. However, it is emphasized that apparatus employing such arrangements will fall within the scope of the present invention.

According to the present invention, apparatus for controlling the positioning of an object and a lens arrangement in a camera system relative to a desired plane to produce an image of the object in such plane comprises means for measuring the object distance and for producing a first distance signal representative thereof, means for measuring the image distance and for producing a second distance signal representative thereof, drive means connected to the camera system for varying both the object and image distances, and a computer connected to both said measuring means so as to receive said first and second distance signals and connected to said drive means to control the operation thereof, said computer being programmed with the lens formula of the camera system to compute, in accordance with the measured values of said distance signals, a control signal for application to said drive means to alter one or both of said distances as necessary so that the image is produced in said plane.

The invention is particularly applicable to controlling a reproduction camera or a photographic enlarger, in that the magnification of, for instance, an enlarger, can be varied as required by moving, say, the copy carriage, the apparatus continually maintaining the image of the copy on the film carriage.

In one embodiment of the invention, the apparatus is arranged such that an operator can manually set the image distance, the computer controlling a servo system operative to set the object distance in accordance with the manually-set image distance. Alternatively, the apparatus can be arranged so that the operator sets the object distance and the computer and servo system set the image distance. In such embodiment, the computer may be arranged to compute and display the magnification of the object in accordance with the magnification formula.

In an alternative embodiment, the computer may be arranged to set the image distance, by means of a further servo system, to obtain a chosen magnification rather than a chosen image distance, with the computer controlling the first-mentioned servo system to set the object distance in accordance therewith. Here again, alternatively, the chosen magnification can be obtained by setting the object distance, the computer and first servo system then setting the image distance in accordance therewith.

The computer is preferably an analogue computer, using conventional operational amplifier circuit units to solve the lens formula to provide an analogue control signal output or outputs in terms of the required object and/or image distances, for application to the servo system or systems. Alternatively, a special purpose or a programmed general purpose digital computer may be used to solve the lens formula to provide a digital output signal or signals for application either to a digital-to-analogue converter or converters to provide an analogue control signal or signals for the servo system or systems, or directly to a digital servo system or systems. Although the computer is preferably electronic, it will be appreciated that other forms of computer, e.g. hydraulic, pneumatic or optical computers, can alternatively be employed.

The means for measuring the object and image distances may comprise a number of potentiometers. If an analogue computer is used, the outputs of the potentiometers may be connected directly thereto, whilst analogue-to-digital converters are employed if the outputs are applied to a digital computer. Alternatively, digital position indicating means such as optical encoders may be used. In this case, the outputs may be fed directly to a digital computer, or via digital-to-analogue converters to an analogue computer. It will be evident that many other types of distance measuring device may be used in place of those specifically mentioned.

In order to enter the values of the focal length and of any necessary node offset of the lens arrangement into the computer, the lens mount may incorporate electrical components, such as resistors, which are respresentative of such values, whereby, when the lens arrangement is fitted to the apparatus, these components are connected to the computer.

The invention may be more readily comprehended from a consideration of the following detailed description, given by way of example only, and by reference to the accompanying drawings, in which:

FIG. 1 is an elevational view of a photographic enlarger including apparatus embodying the present invention;

FIG. 2 is a view of a lens mount used in the enlarger of FIG. 1 and showing circuit components mounted therein;

Figure 3:
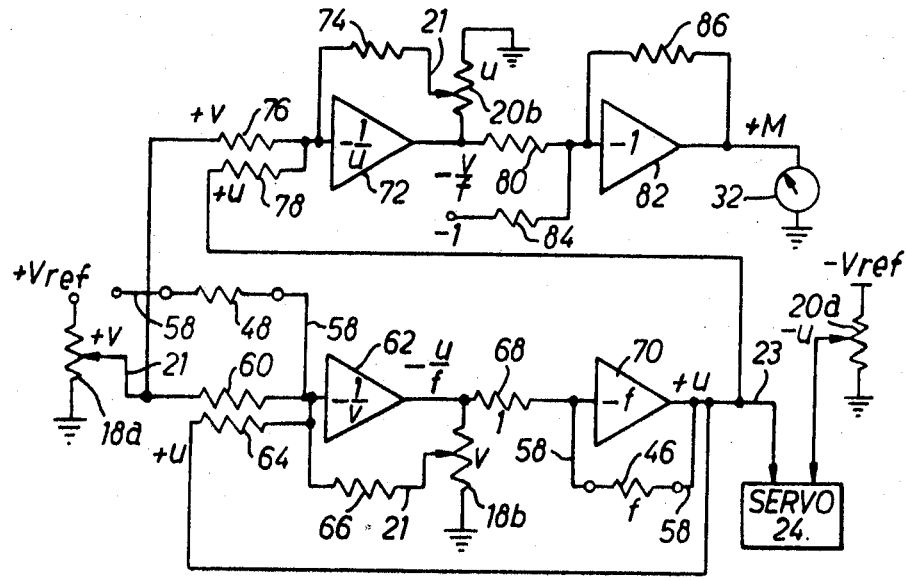
FIG. 3 is a circuit diagram of an analogue computer used in the apparatus employed in FIG. 1.

The photographic enlarger shown generally at 10 in FIG. 1 comprises a film carriage 12, a lens carriage 14 and a copy carriage 16, each of which is movable in the vertical direction, i.e. parallel to a common axis 17. A double potentiometer 18 is fixed to the lens carriage 14 and arranged so that the extent of displacement of each wiper from a reference end is directly proportional to the distance between the lens carriage 14 and the film carriage 12, i.e. the image distance $v$. Thus, when a reference voltage (V ref — FIG. 3) is applied across the ends of one section 18a of the potentiometer 18, the voltage between the wiper and the reference end of that section constitutes an electrical signal which is an analogue of the image distance $v$.

In the same way, another double potentiometer 20 provides electrical signals which are analogues of the distance between the lens carriage 14 and the copy carriage 16, i.e. the object distance $u$. The wipers of the different sections of the potentiometers 18, 20 are connected by wiring 21 to an analogue computer 22; this wiring also includes a conductor for supplying the reference voltage V ref to one end of each said potentiometer section.

The analogue computer 22 is connected to a servo system 24 arranged to drive the copy carriage 16 to alter the object distance $u$. The computer, in a manner desicribed more fully below, provides a control voltage signal on a line 23 for application to the servo system 24, which voltage is an analogue of the computed object distance $u$ necessary to focus the image on the film carriage 12, having reference to the image and object distances measured by the potentiometers 18 and 20. A drive motor 26 which is manually controlled by a signal on a line 27 from a manual control on the computer 22 is operative to move the lens carriage 14 to a desired position, i.e. to alter the image distance $v$ as required.

The computer 22 has a control panel 28 which includes a number of controls shown generally at 30 and a meter 32 displaying the computed magnification of the enlarger.

A lens mount shown generally at 40 in FIG. 2 is detachably mounted in the lens carriage 14. The lens mount 40 comprises a surround 42 mounting a convex lens 44. The lens mount 40 is fitted with two resistors 46, 48 which are connected to respective pairs of terminals 50, 52 and 54, 56. When the lens mount 40 is fitted to the lens carriage 14, the terminals 50–56 mate with corresponding terminals (not shown) in the lens carriage whereby the two resistors 46, 48 are connected into the circuit of the computer 22 by wiring 58 (FIG. 1). The resistances of the resistors 46, 48 are proportional, respectively, to the focal length of the lens and to any necessary offset in the nodal point position of the lens.

The circuit of the analogue computer 22 is illustrated schematically in FIG. 3. The voltage on the wiper of said one section 18a of the potentiometer 18, which is an analogue of the image distance $v$, is applied via the wiring 21 and a resistor 60 to the input of a summing operational amplifier 62. The output control voltage of the computer on the line 23, which is an analogue of the desired object distance $u$, is fed back to the input of the amplifier 62 via resistor 64. The gain of the amplifier 62 is made equal to $-1/v$ by a feedback network comprising the other section 18b of the potentiometer 18, the wiring 21 and a resistor 66, whereby the amplifier output voltage is the analogue of $-(u+v)/v$. Minor algebraic manipulation of the lens formula quoted above shows that $u + v = u \cdot v/f$; therefore the output voltage of the amplifier 62 is also the analogue of $-u/f$. The resistor 48 fitted in the lens mount 40 (FIG. 2) is connected to the input of the amplifier 62 by the wiring 58; this enables the lens nodal offset to be taken into account. The free end of the resistor 48 is connected by the wiring 58 to a reference voltage which is positive or negative depending on the polarity of the node offset.

The output of the amplifier 62 is connected by a resistor 68 to the input of a second operational amplifier 70 which has a gain of $-f$, whereby the output voltage of the amplifier 70 is the analogue of $+u$. The amplifier is given a gain of $-f$ by the provision of the feedback resistor 46 in the lens mount 40 (FIG. 2) which is connected to the amplfier 70 by the wiring 48. The resistances of the resistors 46 and 68 have the ratio $f:1$. The output voltage of the amplifier 70, which represents the desired object distance, is fed over a line 23 to the servo system 24 together with a voltage from the wiper of one section 20a of the potentiometer 20, which represents the actual object distance, so as to position the copy carriage 16 in accordance with the position of the film carriage determined by the potentiometer 18 to ensure that the image is focused on the film carriage 12. The servo system 24 alters the object distance until the two input signals thereto, which represent the actual and desired object distances, are equal.

Location of the feedback resistor 46 of the amplifier 70 in the lens mount 40 simplifies changing lenses by ensuring that the correct value of $f$ is automatically entered into the computer when the lens mount 40 is placed in the lens carriage 14. Similarly, location of the node offset resistor 48 in the lens mount ensures that any necessary node offset is entered into the computer at the same time. In like manner, a further offset voltage can be automatically provided to compensate for the effect of any refracting material, such as a screen, introduced into the optical path.

Computation and display of the magnification M is effected as follows. Substitution for $v$ in the magnification formula $M = v/u$ gives the alternative expression $M = (v/f - 1)$. A further operational amplifier 72, having a gain made equal to $-1/u$ by a feedback network comprising a resistor 74, the wiring 21 and the other section 20b of the potentiometer 20, is connected to the wiper of the potentiometer section 18a via a resistor 76 and to the line 23 via a resistor 78. The amplifier 72 operates in like manner to the amplifier 62 to provide an output voltage which is the analogue of $-v/f$. This output is directed via a resistor 80 to the input of yet another operational amplifier 82 having a gain of $-1$, together, via a resistor 84, with a negative unity signal, to produce an output voltage which is the analogue of $M = (v/f - 1)$, which is fed to the meter display 32 (FIG. 1). A feedback resistor 86 which is equal in value to the resistors 80, 84 gives the amplifier 82 a gain of $-1$.

The manner of operating the apparatus is as follows:

When a change in magnification is required, the operator energises the motor 26 to alter the distance between the lens carriage 14 and the film carriage 12, i.e. to alter the image distance $v$. The computer 22 then operates the servo system 24 so as to move the copy carriage 16, thereby altering the object distance $u$, to maintain the image in acceptable focus on the film carriage 12. When the required image size is obtained, as determined by observation of the magnification display on the meter 32 and/or by direct observation of the image, the motor 26 is deenergized and the enlarger is ready for use.

Figure 4:
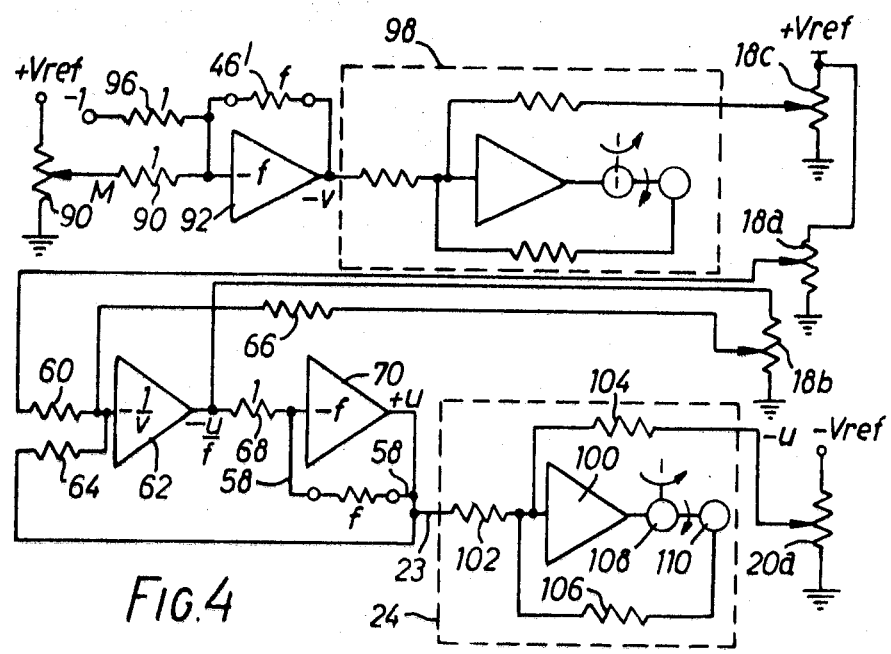
FIG. 4 is a circuit diagram of an alternative analogue computer which may be used in the apparatus employed in FIG. 1.

FIG. 4 illustrates a modified form of computer having the facility of directly setting the magnification M to a desired value. In this figure, the same reference numerals as used in the embodiment of FIGS. 1–3 are employed for elements corresponding to elements of FIGS. 1–3, and the circuit of FIG. 4 is only described insofar as it differs from that of FIG. 3.

In this embodiment, an analogue voltage proportional to a required magnification M is manually set on the wiper of a potentiometer 90 having a reference voltage V ref applied across the ends thereof. The input of an operational amplifier 92 is connected to the wiper of the potentiometer 90 via a resistor 94 and to a negative unity signal by a resistor 96. A feedback resistor 46' which has a value related to each of the resistors 94, 96 by the ratio f:1 gives the amplifier 92 a gain of $-f$; the resistor 46' may be mounted in the lens mount 40 in the same manner as the resistor 46 in the feedback network of the operational amplifier circuit 70. The operational amplifier circuit 92 sums the voltage on the wiper of the potentiometer 90 and the negative unity signal to produce an output voltage which is the analogue of $f(1 - M)$ which, as evidenced by simple algebraic manipulation of the magnification formula $M = v/u$, is also the analogue of $-v$. This signal, which represents the image distance necessary to obtain the desired magnification, is applied to a servo system 98 which replaces the drive motor 26 of the previous embodiment and which is operative on the film carriage 12 to set the image distance $v$ to the necessary value to attain the desired value of M. In the apparatus of FIG. 4, the potentiometer 18 is provided with a third section 18c which provides a voltage which is an analogue of the actual image distance $u$ and which is also applied to the servo system 98. The servo system 98 alters the image distance $v$ by moving the lens carriage 14 until the two input signals, representative of the desired and actual image distances, are the same. The construction of the servo system 98 will not be described in detail as it is substantially the same as that of the servo system 24 which is described hereinbelow.

The servo system 24 comprises an amplifier 100 having an input connected to one end of each of three resistors 102, 104, 106. The output of the amplfier 100 operates a motor 108 which moves the copy carriage 16 to vary the object distance. The other ends of the resistors 102, 104 are connected to receive, respectively, the signals representative of the desired and actual object distances. The servo system operates in a manner well known to those skilled in the art to rotate the motor 108 in the appropriate direction to alter the object distance until the difference between these two signals is zero. Also in a manner which is well known to those skilled in the art, a tachometer 110 is driven by the motor 108 and connected to the other end of the resistor 106 to provide a velocity-proportional feedback signal.

The manner of operation of the apparatus of FIG. 4 is very simple. When a change in magnification is required, the potentiometer 90 is set to the desired value as indicated, for instance, by a graduated scale associated with the potentiometer. The film carriage 12 is moved by the servo system 98 to the corresponding computed value of the image distance $v$, and the servo system 24 accordingly moves the copy carriage 16 to the appropriate position to produce the image at the desired magnification on the film carriage 12.

Figure 5:
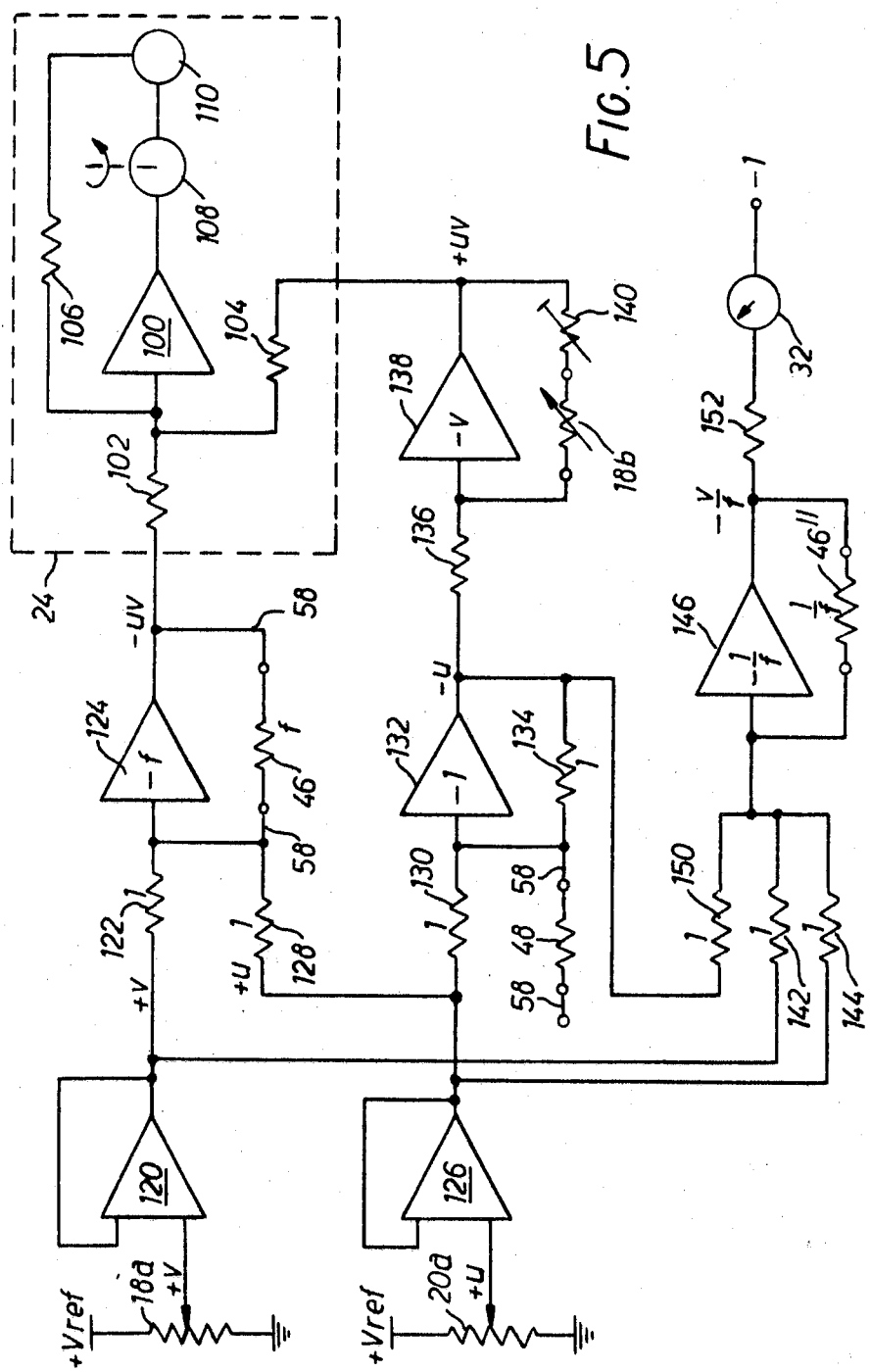
FIG. 5 is a circuit diagram of another alternative analogue computer which may be used in the apparatus employed in FIG. 1.

A third form of analogue computer which may be used in the apparatus of FIG. 1 is shown in FIG. 5. This computer is to some extent a development of that illustrated in FIG. 3 and therefore, in FIG. 5, the same reference numerals as used in the embodiment of FIGS. 1–3 are employed for elements corresponding to elements of FIGS. 1–3.

With reference to FIG. 5, the voltage on the wiper of the section 18a of the potentiometer 18, which is an analogue of the image distance $v$, is applied to the input of an amplifier 120 which has its output connected back to an input to form a voltage follower circuit. The output of the amplifier 120 is also connected via a resistor 122 to the input of a summing operational amplifier circuit 124. A voltage from the section 20a of the potentiometer 20, which is an analogue of the object distance $u$, is also applied, via a further voltage follower amplifier circuit 126 and a resistor 128, to the input of the summing amplifier 124. The amplifier 124 has a feedback network comprising the resistor 46 which is fitted in the lens mount 40 and which has a value, relative to the values of the resistors 122, 128, of $f$:1. The gain of the amplifier 124 is therefore $-f$ and the output voltage of the amplifier is the analogue of $-f(u + v)$ which, by simple algebraic manipulation of the lens formula, can be shown to be equal to $-u \cdot v$.

It should be noted that this output is correct regardless of any lens nodal offset effects, provided that the measured values of $u$ and $v$ obtained as voltage analogues from the two potentiometer sections 18a and 20a are derived from the same geometrical reference point.

The output of the voltage follower amplifier 126 is also connected via a resistor 130 to the input of another summing operational amplifier circuit 132. The amplifier 132 has a feedback network comprising a resistor 134 which is equal in value to the resistor 130 whereby the amplifier has a gain of $-1$. A $u$ node offset derived in similar fashion as for the amplitier 62 in FIG. 3 is also connected to the input of the amplifier 132, whereby the output voltage of the amplifier is a negative analogue of the corrected value of $u$.

The output of the amplifier 132 is connected via a resistor 136 to the input of a further operational amplifier 138. This amplifier is provided with a feedback network comprising the other section 18b of the potentiometer 18, connected to form a variable resistor, and a $v$ node offset trim resistor 140, so that the gain of the amplifier 138 is $-v$. Consequently, the output voltage of the amplifier 138 is the analogue of $+ u \cdot v$.

It can be shown that the sum of the output voltages from the amplifiers 124 and 138, which are representative of $+ u \cdot v$ and $- u \cdot v$, will only be zero when all the lens conjugates are satisfied, i.e. when the object is correctly positioned, for a particular lens arrangement, to focus the image on the desired plane. At any other point the amplitude and polarity of the sum are directly related to the positional offset of the object distance $u$.

The output voltages of the two amplifiers 124, 138 are summed by the servo system 24, instead of the output voltages from the amplifier 70 and from the wiper of the potentiometer section 20a as in the embodiments of FIGS. 3 and 4. Any signal at the input of the amplifier 100 due to a difference between the output voltages of amplifiers 124 and 138 will cause the amplifier 100 to operate the motor 108 to correct the object distance $u$ to a position which gives balance, i.e. zero input to the amplifier 100, and hence optimum focus.

The magnification obtained is computed and displayed as follows. The outputs of the voltage follower circuits 120, 126 which provide voltage analogues of $u$ and $v$ are connected via resistors 142, 144, respectively, to the input of an operational amplifier circuit 146. The input of the amplifier 146 is also connected via a resistor 150 to the output of the amplifier 132 to receive a further voltage which is an analogue of $-u$ (corrected). The amplifier 146 is provided with a feedback network comprising a resistor 46″ which may, like the resistor 46 in the feedback network of the amplifier 124, be fitted in the lens mount 40. The value of the resistor 46″ is related to those of the resistors 142, 144, 150 by the ratio $1/f:1$ so that the gain of the amplifier 146 is $-1/f$ and the output voltage thereof is the analogue of $-v/f$. This output is supplied via a resistor 152 to the meter display 9, together with an output voltage bias of $-1$, to display the magnification in accordance with the formula $M = (v/f - 1)$.

The manner of operating apparatus employing the computer of FIG. 5 is the same as is described above for apparatus employing the computer of FIG. 3.

It can be seen that the computer of FIG. 5 has a number of distinct advantages. The nodal offsets can be easily set in, as they occur in one channel only. Also, the null balancing feature effectively increases the loop sensitivity. Further, amplifier drifts will tend to be self-balancing and high accuracy can therefore be obtained.

We claim:

1. Apparatus for controlling the positioning of an object and a lens arrangement in a camera system relative to a desired plane so as to produce an image of the object in such plane, comprising means for measuring the object distance and for producing a first distance signal representative thereof, means for measuring the image distance and for producing a second distance signal representative thereof; drive means connected to the camera system for varying both the object and image distances, and an analogue computer connected to both said measuring means so as to receive said first and second distance signals and programmed to compute, in accordance with the measured values of said distance signals, a control signal for application via an output thereof to said drive means to alter one of said distances as necessary so that the image is produced in said plane, said computer comprising a first operational amplifier circuit having a feedback network arranged to give the circuit a gain equal to the negative focal length of the lens arrangement of the camera system and an input connected to receive the first and second distance signals, a second operational amplifier circuit having a feedback network arranged to give the circuit a gain of negative unity and an input connected to receive one of said distance signals and a node offset signal for said one distance signal, and a third operational amplifier having a feedback network arranged to give the circuit a gain equal to the negative of the other of said distance signals and an input connected to the output of said second circuit, the outputs of said first and third circuits being connected together and to said output of the computer.

2. Apparatus as claimed in claim 1, wherein each of said measuring means comprises a potentiometer and means for keeping a wiper of the potentiometer spaced from an end thereof by an amount proportional to the distance being measured.

3. Apparatus as claimed in claim 1, wherein said drive means includes a servo system connected to the outputs of said computer and arranged for varying said one of the object and image distances, and a manually controlled motor arranged for varying the other of said distances.

4. Apparatus as claimed in claim 1, wherein said inputs of said first and second operational amplifier circuits receive said distance signals by way of a pair of voltage follower circuits each connected by a respective one of said measuring means for passing a respective one of said signals.

5. Apparatus as claimed in claim 1, wherein said feedback network of said operational amplifier circuit includes a circuit component representative of said focal length and mounted in the lens mount of the camera system for detachable connection into said network.

6. Apparatus as claimed in claim 1, wherein said feedback network of said third operational amplifier circuit includes a variable value circuit component and means for varying the value thereof in accordance with the magnitude of the other of said object and image distances.

7. Apparatus as claimed in claim 1, wherein said analogue computer further comprises a fourth operational amplifier circuit having a feedback network arranged to give the circuit a gain equal to the negative reciprocal of the focal length of the lens arrangement of the camera system and an input connected to receive said first and second distance signals and connected to the output of said second operational amplifier circuit, and display means having a first input connected to the output of said fourth circuit and a second input connected to receive a negative unity signal.

8. Apparatus as claimed in claim 7, wherein each of said measuring means comprises a potentiometer and means for keeping a wiper of the potentiometer spaced from an end thereof by an amount proportional to the distance being measured.

* * * * *